US012613817B2

(12) United States Patent
Wang et al.

(10) Patent No.: US 12,613,817 B2
(45) Date of Patent: Apr. 28, 2026

(54) DATA PROCESSING DEVICE AND METHOD

(71) Applicant: xFusion Digital Technologies Co., Ltd., Henan (CN)

(72) Inventors: Yunfu Wang, Zhengzhou (CN); Yimeng Su, Zhengzhou (CN); Yonggui Liang, Zhengzhou (CN)

(73) Assignee: XFUSION DIGITAL TECHNOLOGIES CO., LTD., Zhengzhou (CN)

( * ) Notice: Subject to any disclaimer, the term of this patent is extended or adjusted under 35 U.S.C. 154(b) by 0 days.

(21) Appl. No.: 18/883,823

(22) Filed: Sep. 12, 2024

(65) Prior Publication Data

US 2025/0004957 A1     Jan. 2, 2025

Related U.S. Application Data

(63) Continuation     of     application     No. PCT/CN2023/081758, filed on Mar. 15, 2023.

(30) Foreign Application Priority Data

Jun. 30, 2022     (CN) ......................... 202210764200.9

(51) Int. Cl.
*G06F 13/18*          (2006.01)
*G06F 12/1009*        (2016.01)
*G06F 13/40*          (2006.01)
(52) U.S. Cl.
CPC .......... *G06F 13/18* (2013.01); *G06F 12/1009* (2013.01); *G06F 13/4022* (2013.01)
(58) Field of Classification Search
CPC .. G06F 13/18; G06F 12/1009; G06F 13/4022; G06F 12/0653; G06F 12/10;

(Continued)

(56) References Cited

U.S. PATENT DOCUMENTS

| | | | | | |
|---|---|---|---|---|---|
| 11,074,208 | B1 * | 7/2021 | Dastidar | ............. | G06F 13/1663 |
| 2009/0072856 | A1 * | 3/2009 | Subramaniam | ..... | G06F 13/1668 |
| | | | | | 326/38 |

(Continued)

FOREIGN PATENT DOCUMENTS

| | | | | | |
|---|---|---|---|---|---|
| CA | 1102427 | * | 6/1981 | ............. | G06F 15/16 |
| CN | 109710544 A | | 5/2019 | | |

(Continued)

OTHER PUBLICATIONS

S. J. Park et al., "Scaling of Memory Performance and Capacity with CXL Memory Expander," 2022 IEEE Hot Chips 34 Symposium (HCS), Cupertino, CA, USA, 2022, pp. 1-27 (Year: 2022).*

*Primary Examiner* — Reginald G Bragdon
*Assistant Examiner* — Zakaria Mohammed Belkhayat
(74) *Attorney, Agent, or Firm* — WOMBLE BOND DICKINSON (US) LLP

(57)          ABSTRACT

This disclosure discloses a data processing device and method. Specific solutions are as follows: The data processing device includes a processor and an expansion storage apparatus. The expansion storage apparatus is connected to the processor through a CXL interface, and the expansion storage apparatus is configured to store to-be-accessed data of the processor; and a highest priority is configured for a request message for obtaining the to-be-accessed data stored in the expansion storage apparatus. When receiving a request message for processing first data, the processor obtains to-be-accessed data corresponding to the first data from the expansion storage apparatus, to process the first data.

20 Claims, 4 Drawing Sheets

(58) Field of Classification Search
CPC ............... G06F 13/161; G06F 12/0284; G06F
12/1027; G06F 13/1668; G06F
2212/1024; G06F 2212/254; G06F
2212/684; G06F 2213/0026
See application file for complete search history.

(56) References Cited

U.S. PATENT DOCUMENTS

| | | | | |
|---|---|---|---|---|
| 2020/0371953 | A1 | 11/2020 | Guo et al. | |
| 2021/0349840 | A1* | 11/2021 | Kumar | ................ G06F 13/4068 |
| 2022/0197819 | A1* | 6/2022 | Kumar | .................. G06F 12/109 |

FOREIGN PATENT DOCUMENTS

| | | | |
|---|---|---|---|
| CN | 114020655 A | 2/2022 | |
| CN | 114064524 A | 2/2022 | |
| WO | WO-2022125254 A1 * | 6/2022 | ......... G06F 13/1668 |

* cited by examiner

DATA PROCESSING DEVICE AND METHOD

This application is a continuation of International Application No. PCT/CN2023/081758, filed on Mar. 15, 2023, which claims priority to Chinese Patent Application No. 202210764200.9, filed on Jun. 30, 2022, both of which are hereby incorporated by reference in their entireties.

TECHNICAL FIELD

This disclosure relates to the field of computers, and in particular, to a data processing device and method.

BACKGROUND

In the computer data storage field, a processor has an extremely high requirement on latency when reading data. To meet latency requirement for data reading, addressing-related data is usually stored in storage space outside a memory in the industry. For example, a translation lookaside buffer (TLB), which is a memory management unit, is essentially a cache configured to increase a speed of translating a virtual address into a physical address, and can be used to effectively shorten the latency of data reading.

In a computer application process, some scenarios requiring high-performance frequent table lookup often occur for a processor. In these scenarios, latency greatly affects access performance. For example, when a TLB cache miss (Cache Miss) occurs during memory access, a memory needs to be accessed first to obtain a page table. After a virtual address is translated into a physical address, a physical memory is accessed. Consequently, an access latency is increased by latency of a double data rate (DDR) access (the latency is about 62 nanoseconds to 93 nanoseconds), and memory access time performance is obviously degraded. In a scenario in which there is a high TLB miss rate, for example, a sparse memory access scenario (sparse/graph application), where a TLB cache has a high miss rate (20% to 40%), memory access time performance is obviously degraded.

SUMMARY

This disclosure provides a data processing device and method, to improve memory access time performance.

To achieve the foregoing objective, the following technical solutions are used in embodiments of this disclosure:

According to a first aspect, a data processing device is provided. The data processing device includes a processor and an expansion storage apparatus. The expansion storage apparatus is connected to the processor through a compute express link (CXL) interface. The expansion storage apparatus is configured to store to-be-accessed data of the processor. The processor is configured to obtain a virtual address of first data after receiving a request message for processing the first data, and obtain the to-be-accessed data from the expansion storage apparatus, where the to-be-accessed data is used to identify a physical address corresponding to the virtual address. The processor is further configured to read the first data according to the physical address.

In the solution provided in this disclosure, the to-be-accessed data of the processor is stored in the expansion storage apparatus connected to the processor through the CXL interface. Because of low latency performance of the CXL interface, the processor reads the to-be-accessed data from the expansion storage apparatus through the CXL interface, even in a frequent access scenario, data processing can also be implemented at low latency. Therefore, memory access time performance is greatly improved in the solution in this disclosure.

In an embodiment, the to-be-accessed data is data of a process that requires low latency.

In an embodiment, the expansion storage apparatus may include a CXL chip and storage space expanded based on the CXL chip. The expanded storage space is configured to store the to-be-accessed data. A highest priority is configured for a request message for obtaining the expanded storage space.

In an embodiment, the expanded storage space includes a static random access memory (SRAM) in the CXL chip. That is, the expanded storage space is on-chip storage space. In this way, costs are reduced.

In an embodiment, the expanded storage space includes an off-chip quad data rate (QDR) series storage connected to the CXL chip. That is, the expanded storage space is off-chip storage space. In this way, low-latency storage with larger capacity is implemented.

In an embodiment, the CXL chip is further configured to configure the highest priority for the request message. In this way, it is ensured that these request messages are preferentially processed, and data processing latency is further shortened.

In an embodiment, the data processing device may further include a property storage unit. The property storage unit is configured to register the expansion storage apparatus with the processor in a boot phase of the data processing device. In this way, in a running phase of the data processing device, the processor implements low-latency memory access through the expansion storage apparatus.

In an embodiment, the property storage unit is specifically configured to register, with the processor, registration information of the storage space that is in the expansion storage apparatus and that is configured to store the to-be-accessed data. The registration information may include one or more of the following information: capacity, latency, or bandwidth.

In an embodiment, the property storage unit may be deployed inside the CXL chip, and be refreshed through software configuration.

In an embodiment, the property storage unit may be deployed in a non-volatile storage outside the CXL chip.

In an embodiment, the CXL chip may include an address decoder for addressing. The address decoder is configured to map a physical address of the processor to a physical address of the expanded storage space. In this way, the expansion storage apparatus forwards the request message to the corresponding expanded storage space when receiving the request message sent by the processor.

In an embodiment, the to-be-accessed data may be a page table, and the page table is used to map a virtual address of the processor to a physical address of a memory.

According to a second aspect, a data processing method is provided, applied to a data processing device. The data processing device includes a processor and an expansion storage apparatus. The expansion storage apparatus is connected to the processor through a CXL interface, and the expansion storage apparatus is configured to store to-be-accessed data of the processor. The method may include: The processor receives a request message for processing first data, and obtains a virtual address of the first data; then the processor obtains the to-be-accessed data from the expansion storage apparatus, where the to-be-accessed data is used to identify a physical address corresponding to the virtual address; and the processor is further configured to read the first data according to the physical address. The processor obtains to-be-accessed data corresponding to the first data from the expansion storage apparatus, to process the first data.

In embodiments described in this disclosure, the to-be-accessed data of the processor is stored in the expansion storage apparatus connected to the processor through the CXL interface. Because of low latency performance of the CXL interface, the processor reads the to-be-accessed data from the expansion storage apparatus through the CXL interface, even in a frequent access scenario, data processing can also be implemented at low latency. Therefore, memory access time performance is greatly improved in the solution in this disclosure.

In an embodiment, the expansion storage apparatus may include a CXL chip and storage space expanded based on the CXL chip. The expanded storage space is configured to store the to-be-accessed data of the processor. A highest priority is configured for a request message for obtaining the expanded storage space.

In an embodiment, the expanded storage space includes a SRAM in the CXL chip. That is, the expanded storage space is on-chip storage space. In this way, costs are reduced.

In an embodiment, the expanded storage space includes an off-chip QDR series storage connected to the CXL chip. That is, the expanded storage space is off-chip storage space. In this way, low-latency storage with larger capacity is implemented.

In an embodiment, the method may further include: registering the expansion storage apparatus with the processor in a boot phase of the data processing device. In this way, in a running phase of the data processing device, the processor implements low-latency memory access through the expansion storage apparatus.

In an embodiment, the registering the expansion storage apparatus with the processor includes: registering, with the processor, registration information of the storage space that is in the expansion storage apparatus and that is configured to store the to-be-accessed data of the processor. The registration information includes one or more of the following information: capacity, latency, or bandwidth.

In an embodiment, the method may further include: mapping a physical address of the processor to a physical address of the expanded storage space. In this way, the expansion storage apparatus forwards the request message to the corresponding expanded storage space when receiving the request message sent by the processor.

In an embodiment, the method may further include: configuring a highest priority for a request message for accessing the to-be-accessed data that is of the processor and that is stored in the expansion storage apparatus, to ensure an access latency of data corresponding to the request message.

In an embodiment, the to-be-accessed data may be a page table, and the page table is used to map a virtual address of the processor to a physical address of a memory.

According to a third aspect, a computer-readable storage medium is provided, including instructions, where when the instructions run on a computer, the computer is enabled to perform the data processing method according to any one of the foregoing aspects or possible implementations.

According to a fourth aspect, a computer program product is provided. When the computer program product runs on a computer, the computer is enabled to perform the data processing method according to any one of the foregoing aspects or possible implementations.

According to a fifth aspect, a chip system is provided. The chip system includes a processor, and may further include a memory, configured to implement a function of the expansion storage apparatus in the foregoing method. The chip system may include a chip, or may include a chip and another discrete device.

The solutions provided in the third aspect to the fifth aspect are used to implement the method provided in the second aspect, and therefore the third aspect to the fifth aspect can achieve a same beneficial effect as the first aspect. Details are not described herein again.

It should be noted that, all possible implementations of any one of the foregoing aspects may be combined without a contradiction in the solutions.

DESCRIPTION OF EMBODIMENTS

Figure 1:
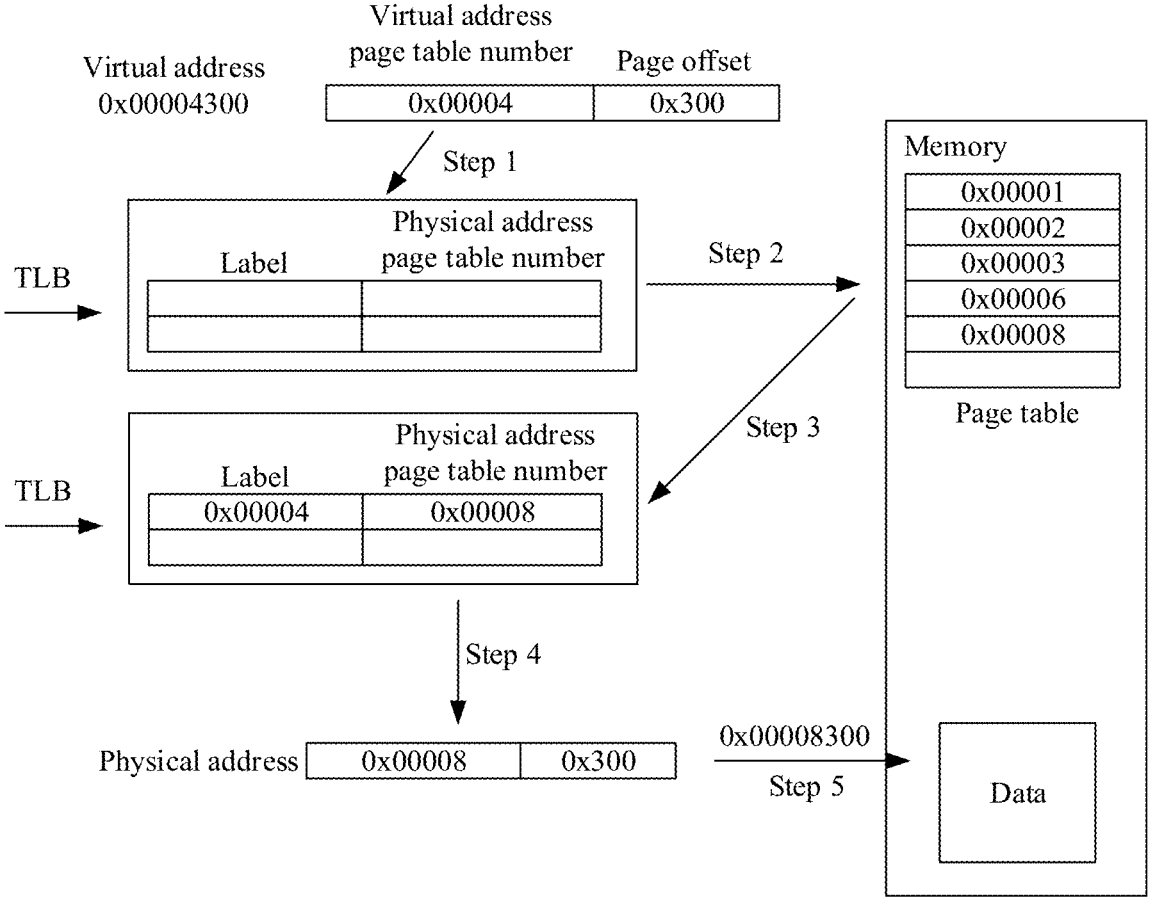
FIG. 1 is a schematic flowchart of memory access.

The terms such as "first", "second", and "third" in the specification, claims, and accompanying drawings of this disclosure are used to distinguish between different objects, and are not used to limit a specific sequence.

In embodiments of this disclosure, words such as "example" or "for example" are used to represent examples, illustrations, or descriptions. Any embodiment or design solution described as "example" or "for example" in embodiments of this disclosure should not be construed as being more preferred or advantageous than other embodiments or design solutions. Exactly, use of the words such as "example" or "for example" is intended to present relevant concepts in a specific manner for ease of understanding.

In the descriptions of this disclosure, unless otherwise stated, "/" represents an "or" relationship between associated objects, for example, A/B may represent A or B. In this disclosure, "and/or" merely describes an association relationship between associated objects, and represents that three relationships may exist. For example, A and/or B may represent that A exists alone, both A and B exist, and B exists alone, where A and B may be singular or plural. In addition, in the descriptions of this disclosure, unless otherwise stated, "a plurality of" means two or more. "At least one of the following items" or similar expression thereof means any combination of these items, including any combination of a single item or a plurality of items. For example, at least one of a, b, or c may represent a, b, c, a-b, a-c, b-c, or a-b-c, where a, b, and c may be singular or plural.

In embodiments of this disclosure, "at least one" may also be described as "one or more", and "a plurality of" may be two, three, four, or more. This is not limited in this disclosure.

Before embodiments of this disclosure are described, terms used in embodiments of this disclosure are first explained.

A physical address is an entity that exists in a computer, and remains unique and independent in each computer. It may also be referred to as a physical memory. For example, a size of physical space on a 32-bit machine can theoretically reach 2^32 bytes (4 GB).

A virtual address is address space that is allocated to a process and that does not actually exist in a computer. Each process has independent virtual address space, and each process can access the virtual address space of the process, to implement effective process isolation.

Table 1 shows typical access time latency at different locations in a memory hierarchy of a computer.

TABLE 1

| Memory hierarchy (Memory Hierarchy) | Access latency (cycle) Access latency (cycle) | Access latency (nanoseconds) Access latency (ns) |
|---|---|---|
| L1 CACHE (layer 1 cache) | About 4 cycles (cycles) | 1.25 ns |
| L2 CACHE | About 10 cycles (cycles) | 3.125 ns |
| L3 CACHE | About 30 cycles to 50 cycles (cycles) | 9.375 ns to 15.625 ns |
| Local (Local) DRAM | About 200 cycles to 300 cycles (cycles) (60 ns) | 62.5 ns to 93.75 ns |
| Remote (remote) DRAM | >300 cycles (cycles) | >90.75 ns |

In some actual application scenarios, a scenario requiring high-performance table lookup occurs for a processor, that is, the scenario that has a high requirement on latency for a table lookup process. For example, when a TLB cache miss occurs during memory access, a memory needs to be accessed first to obtain a page table. After a virtual address is translated into a physical address, a physical memory is accessed. Consequently, an access latency is increased by latency of a DDR access (as shown in Table 1, the latency is 62 ns to 93 ns), and performance is obviously degraded.

Currently, the page table is stored in a main memory. When the TLB cache miss occurs, the memory needs to be accessed to obtain the page table (page table), to map a virtual page table number in the virtual address to a physical page table number in the physical address. Then the virtual address is translated into the physical address. A procedure thereof is shown in FIG. 1, and includes the following steps.

Step 1: A processor queries a TLB cache based on a virtual address.

Step 2: After a TLB cache miss occurs, the processor accesses the page table stored in the memory, queries a mapping relationship between the virtual page table number and the physical page table number, and obtains the physical page table number 0x00008 corresponding to the virtual page table number 0x00004.

Step 3: The processor refreshes the virtual page table number and the physical page table number to the TLB cache.

Step 4: The processor calculates a physical address based on a page offset and the physical page table number.

For example, the processor calculates a physical address 0x00008300 based on a page offset 0x300 and the physical page table number 0x00008.

Step 5: The processor accesses data of the memory based on the physical address.

For example, the processor accesses the memory based on the physical address 0x00008300, and reads data stored at this location.

It can be learned from the procedure shown in FIG. 1 that when the TLB cache miss occurs, a memory access latency is estimated as: Latency=TLB access latency+page table access latency (memory access)+data access latency (memory access).

According to the typical access time latency shown in Table 1, the TLB access latency is 10 ns, the page table access latency (memory access) is 90 ns, and the data access latency (memory access) is 90 ns. Therefore, in the TLB cache miss scenario, time for accessing the data of the memory is 10 ns+90 ns+90 ns=190 ns.

In a sparse memory access scenario (for example, sparse/graph application), the TLB cache has a high miss rate (20% to 40%), and a TLB miss rate is 0.01% to 1% in a typical scenario.

As an open industry standard, CXL can provide high-bandwidth and low-latency connections among dedicated compute, memory, I/O, and storage elements in a data center. CXL 1.1 and CXL 2.0 protocols are defined based on peripheral component interconnect express (PCIe) Gen5 (32 gigabit transmission per second (GT/s)), link latency of the CXL 1.1 and CXL 2.0 protocols is typically 40 ns, and as claimed by the industry, can already reach 12 ns.

Based on this, one or more embodiments of this disclosure provides a data processing device and method, which offer low-latency storage space (expanded storage space in a storage apparatus described in this disclosure) to the processor through a CXL interface, and to-be-accessed data that demands low-latency access is stored in ultra-low latency storage space, to improve memory access time performance.

The following describes implementations of embodiments of this disclosure in detail with reference to the accompanying drawings.

Figure 2:
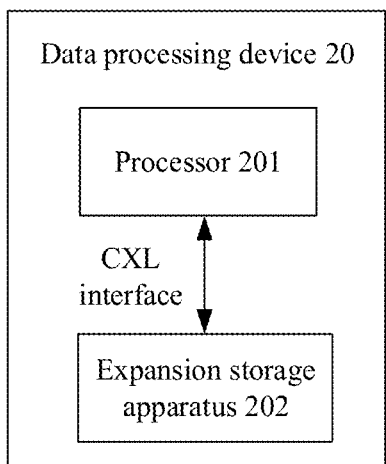
FIG. 2 is a schematic diagram of a data processing device according to an embodiment of this disclosure.

In one aspect, this disclosure provides a data processing device. As shown in FIG. 2, the data processing device 20 may include a processor 201 and an expansion storage apparatus 202.

The expansion storage apparatus 202 is connected to the processor 201 through a CXL interface. The expansion storage apparatus 202 is configured to store to-be-accessed data of the processor 201.

The CXL interface transmits data according to a CXL protocol.

For example, the to-be-accessed data of the processor 201 may be data of a process that requires low latency. For example, the to-be-accessed data of the processor 201 may be the page table in the TLB in the foregoing example. Certainly, a specific type of the to-be-accessed data is not limited in this embodiment of this disclosure.

The processor 201 is configured to obtain to-be-accessed data corresponding to first data from the expansion storage apparatus 202 when receiving a request message for processing the first data, to process the first data.

Specifically, the processor 201 receives the request message for processing the first data. If the to-be-accessed data corresponding to the first data is stored in the expansion storage apparatus, the to-be-accessed data corresponding to the first data is read from the expansion storage apparatus 202, and then the first data is processed.

Wherein the to-be-accessed data corresponding to the first data is used to process the first data. In different scenarios, the to-be-accessed data corresponding to the first data varies with a manner of processing the first data.

For example, such as in the foregoing TLB scenario, when the processor 201 reads the first data, the to-be-accessed data corresponding to the first data is a page table, and the processor 201 obtains the page table from the expansion storage apparatus 202, to obtain a physical address of the first data, for reading the first data.

Optionally, the expansion storage apparatus 202 may configure a highest priority for a request message for obtaining the to-be-accessed data by the processor.

For example, a queue form may be used for implementation. For example, a queue is configured to store the request message for obtaining the to-be-accessed data that is of the processor 201 and that is stored in the expansion storage apparatus 202, where the queue has a highest priority.

In a solution provided in this disclosure, the to-be-accessed data of the processor is stored in the expansion storage apparatus connected to the processor through the CXL interface, and the highest priority is configured for the request message for obtaining the to-be-accessed data stored in the expansion storage apparatus. Because of low latency performance of the CXL interface, the processor reads the to-be-accessed data from the expansion storage apparatus through the CXL interface, even in a frequent access scenario, data processing can also be implemented at low latency. In addition, the highest priority is configured for the request message for obtaining the to-be-accessed data stored in the expansion storage apparatus. In this way, it is ensured that these request messages are preferentially processed, and data processing latency is further shortened. Therefore, memory access time performance is greatly improved in the solution in this disclosure.

The processor 201 may be a control center of the data processing device 20. For example, the processor 201 may be a central processing unit (CPU), an application-specific integrated circuit (ASIC), or one or more integrated circuits configured to implement this embodiment of this disclosure, for example, one or more microprocessors (digital signal processor, DSP), or one or more field programmable gate arrays (FPGAs).

In an embodiment, the to-be-accessed data may be a page table, and the page table is used to map a virtual address of the processor 201 to a physical address of a memory.

Figure 3:
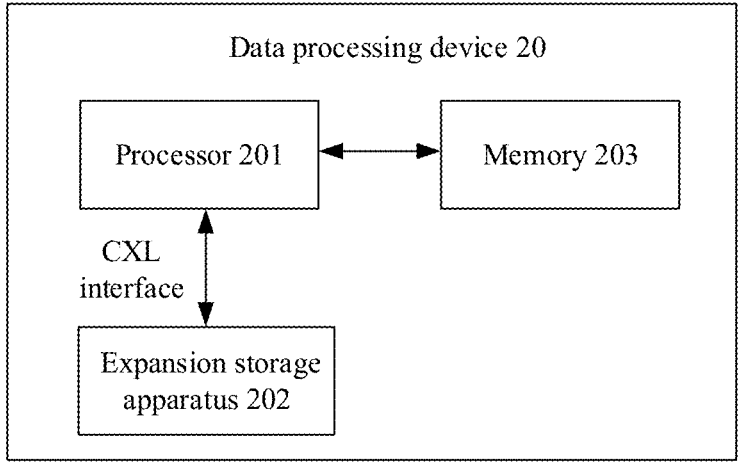
FIG. 3 is a schematic diagram of another data processing device according to an embodiment of this disclosure.

For example, as shown in FIG. 3, the data processing device 20 may further include a memory 203. The memory 203 is configured to store data. Specifically, the memory 203 may store data according to a computer protocol standard. The to-be-accessed data of the processor 201 is a page table, and the page table is used to map the virtual address of the processor 201 to the physical address of the memory. The processor 201 is specifically configured to: when receiving the request message for processing the first data, query the page table from the expansion storage apparatus 202 to obtain a physical address of the first data, and further access the memory based on the physical address of the first data to read the first data.

For example, the page table is stored in the expansion storage apparatus 202. This can shorten a data access latency in a TLB miss scenario, and improve system performance.

In an embodiment, the to-be-accessed data may be a random entry in the network forwarding field, and the random entry may be used to indicate a correspondence between an ingress port and an egress port for data forwarding, to guide a data forwarding path. The processor 201 is specifically configured to: when receiving the request message for processing the first data, query the random entry from the expansion storage apparatus to obtain an egress port of the first data, and further forward the first data through the egress port.

In an embodiment, the data of the process that requires low latency may be stored in the expansion storage apparatus 202.

In an embodiment, all to-be-accessed data of the processor 201 may be stored in the expansion storage apparatus 202.

Figure 4:
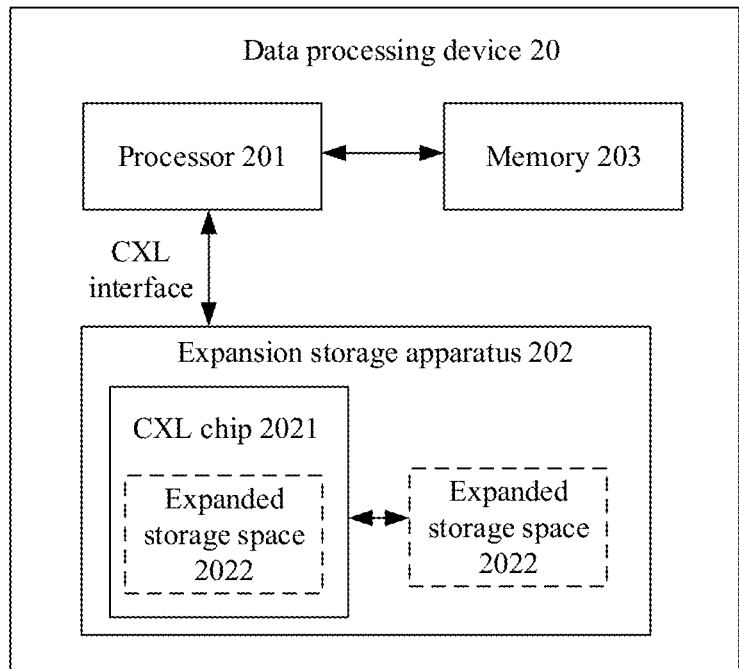
FIG. 4 is a schematic diagram of a still another data processing device according to an embodiment of this disclosure.

In some embodiments, as shown in FIG. 4, the expansion storage apparatus 202 may include a CXL chip 2021 and storage space 2022 expanded based on the CXL chip 2021. The expanded storage space 2022 is configured to store the to-be-accessed data of the processor 201. The CXL chip 2021 may also be referred to as CXL device (Device). An actual product form of the CXL chip 2021 is not limited in this embodiment of this disclosure.

The expanded storage space 2022 may be deployed inside the CXL chip 2021, or the expanded storage space 2022 may be deployed outside the CXL chip 2021. This is not limited in this embodiment of this disclosure.

Figure 5:
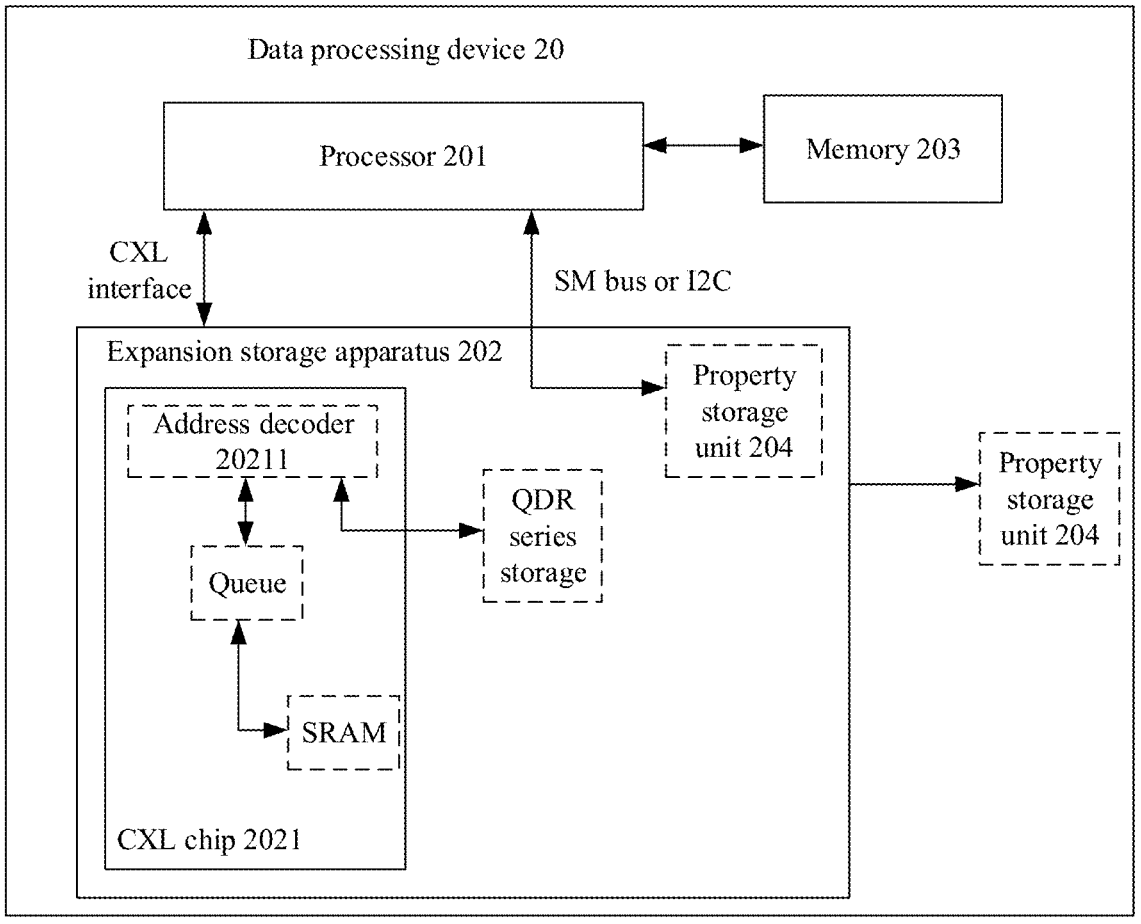
FIG. 5 is a schematic diagram of a yet another data processing device according to an embodiment of this disclosure.

Further, as shown in FIG. 5, the CXL chip 2021 may include an address decoder 20211. The address decoder 20211 is configured to map a physical address of the processor 201 to a physical address of the expanded storage space 2022.

For example, the address decoder 20211 may be a decoder, and an implementation of the address decoder 20211 is similar to a standard recommendation manner. Details are not described herein again. The decoder is configured to implement address translation from a host physical address (HPA) to a device physical address (DPA), and forward an access request for an ultra-low latency storage to the expanded storage space 2022.

For example, as shown in FIG. 5, when the expanded storage space 2022 is inside the CXL chip 2021, the expanded storage space 2022 may be a SRAM in the CXL chip 2021.

For example, as shown in FIG. 5, when the expanded storage space 2022 is outside the CXL chip 2021, the expanded storage space 2022 may be an off-chip QDR series storage connected to the CXL chip 2021. The off-chip QDR series storage is a low-latency unit.

For example, when the expanded storage space 2022 is outside the CXL chip 2021, an ultra-low latency storage-QDRIV controller may be added to hardware of the CXL chip 2021. A QDRIV memory chip (that is, an off-chip QDR) is connected to the controller, and capacity is 288 MB. latency of accessing QDRIV through the CXL chip 2021 is 22 ns (where the latency of accessing QDRIV through the CXL chip 2021 is 10 ns, and CXL link latency is 12 ns), and bandwidth is 19 gigabytes per second (GB/s).

It should be noted that an actual product form and a deployment location of the expanded storage space 2022 may be configured according to an actual requirement, and are described by using examples and are not specifically limited in this embodiment of this disclosure.

Further, as shown in FIG. 5, the data processing device 20 may further include a property storage unit 204. The property storage unit 204 may be deployed inside or outside the expansion storage apparatus 202, or the property storage unit 204 may be connected to the processor 201 through the expansion storage apparatus 202 and a bus. The property storage unit 204 is configured to register the expansion storage apparatus 202 with the processor 201 in a boot phase of the data processing device 20.

Specifically, the property storage unit 204 is configured to register, with address space of the processor, registration information of the expanded storage space 2022 that is in the expansion storage apparatus 202 and that is configured to store the to-be-accessed data of the processor 201. The registration information may include one or more of the following information: capacity, latency, or bandwidth.

For example, the registration information of the expanded storage space 2022 may be obtained through a system management bus (SMBus) or an inter-integrated circuit (I2C) in a boot phase of a basic input/output system (BIOS) of the data processing device 20, and the registration information is stored in a heterogeneous memory property table (HMAT). The registration information is mapped to system (System) random access memory (RAM) space in the boot phase. When a process starts, the ultra-low latency storage is applied for use, and a page table of the process may be stored in the expanded storage space 2022.

The property storage unit 204 may be an ultra-low latency storage space property (low latency memory property, LLMP) control module.

The property storage unit 204 may be deployed inside the CXL chip 2021, and be refreshed through software configuration. Alternatively, the property storage unit 204 may be deployed in a volatile storage outside the CXL chip 2021. A deployment location of the property storage unit 204 is not limited in this embodiment of this disclosure.

For example, a flash or an electrically erasable programmable read-only memory (EEPROM) may be externally connected to the CXL chip 2021 to store the registration information of the expanded storage space 2022, and firmware (Firmware) of the CXL chip 2021 is used to complete filling of the registration information.

In an embodiment, the CXL chip 2021 may add, in an expansion manner, a high-priority egress queue (Egress Queue) for processing the ultra-low latency storage. A highest priority is configured for the queue, and the queue is used to store a request message for accessing the expanded storage space 2022, or the queue is used to store data (or returned data) corresponding to the request message for accessing the expanded storage space 2022. The egress queue can ensure high-priority processing of the ultra-low latency storage (that is, a request message for accessing the to-be-accessed data that is of the processor 201 and that is stored in the expansion storage apparatus 202), to shorten access latency of the ultra-low latency storage. When the egress queue for the ultra-low latency storage is scheduled, a priority of the egress queue is higher than a priority of another egress queue (Egress Queue) defined according to the CXL protocol.

For example, a scheduling algorithm for the egress queue for the ultra-low latency storage may be weighted round robin (WRR), and a scheduling weight may be configured as 4:1.

Quality of service (QOS) of ultra-low latency access provided in this disclosure may follow a QoS state defined in the CXL (that is, support light, optimal, moderate, and severe states). A difference lies in that a new high-priority egress queue is used for ultra-low latency access provided in this disclosure.

For example, the page table in the foregoing TLB scenario is stored in the expanded storage space 2022. As described above, in the TLB cache miss scenario, the time for accessing the data of the memory is: Latency=TLB access latency+ page table access latency (memory access)+data access latency (memory access). In the solution provided in this disclosure, time for accessing data of the memory in the TLB cache miss scenario is:

Latency=10 ns+22 ns (CXL 12 ns, QDRIV 10 ns)+90 ns=122 ns. read latency is shortened by 68 ns compared with 190 ns in a conventional solution.

If a miss rate is 40%, access performance of the convention solution is: 60% hit*(10 ns+90 ns)+40%*(10 ns+90 ns+90 ns)=136, and access performance of the solution provided in this disclosure is: 60% hit*(10 ns+90 ns)+40%* (10 ns+22 ns+90 ns)=108.8. access performance may be improved by (136−108.8)/136=20%.

In another aspect, this disclosure provides a data processing method, applied to the foregoing data processing device 20. A structure of the data processing device 20 is described in detail in the foregoing embodiment. Details are not described herein again.

Figure 6:
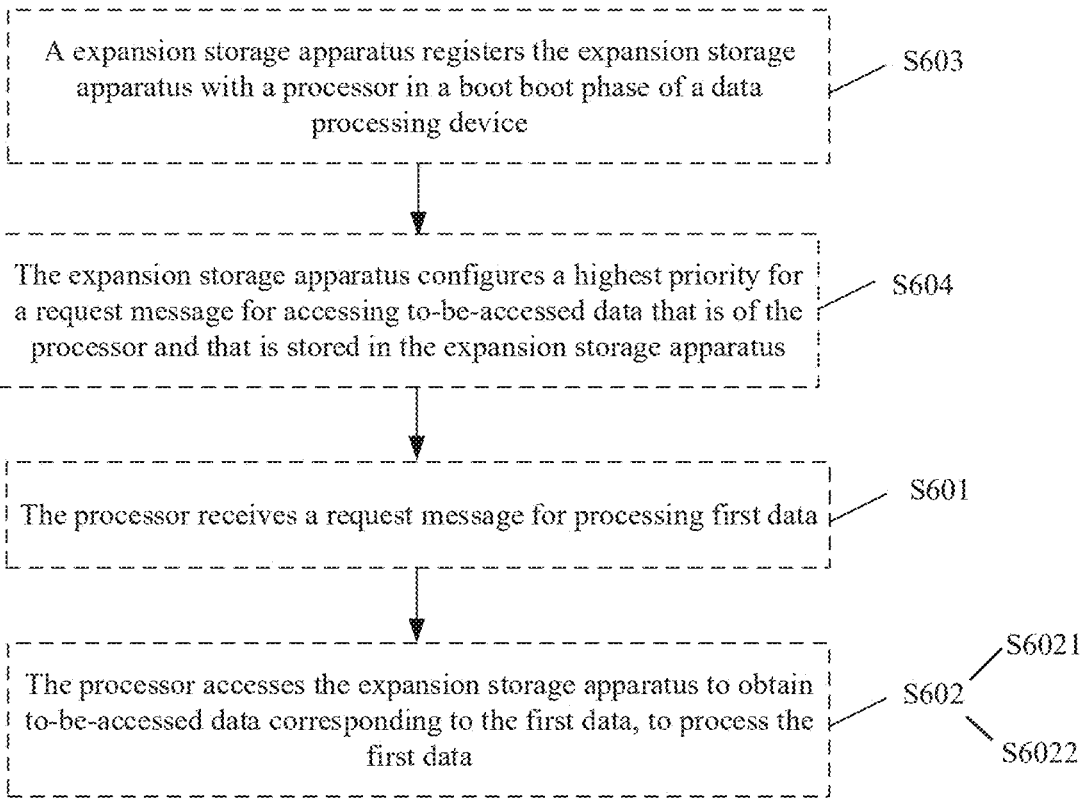
FIG. 6 is a schematic flowchart of a data processing method according to an embodiment of this disclosure.

As shown in FIG. 6, the data processing method provided in this embodiment of this disclosure may include:

At operation S601: A processor receives a request message for processing first data.

Specifically, in S601, the processor receives the request message for processing the first data, if to-be-accessed data corresponding to the first data is stored in an expansion storage apparatus, operation S602 is executed.

For example, if the to-be-accessed data is a page table, the to-be-accessed data corresponding to the first data is a page table. If the to-be-accessed data is a random forwarding entry, the to-be-accessed data corresponding to the first data is a random forwarding entry.

At operation S602: The processor obtains the to-be-accessed data corresponding to the first data from the expansion storage apparatus, to process the first data.

Specifically, in S602, the processor forwards a request message to the expansion storage apparatus, and the expansion storage apparatus obtains, according to the request message, the to-be-accessed data corresponding to the first data, and returns the to-be-accessed data. Optionally, S602 may be specifically implemented as S6021 and S6022.

At operation S6021: The processor sends a request message to the expansion storage apparatus.

At operation S6022: After receiving the request message, the expansion storage apparatus maps a physical address of the processor to a physical address of low-latency storage space.

In operation S6022, the physical address of the processor is mapped to a physical address of expanded storage space, the request message is forwarded to corresponding storage space, and the to-be-accessed data corresponding to the first data is read from the corresponding storage space and returned to the processor, so that the processor obtains the to-be-accessed data corresponding to the first data, and processes the first data.

For example, to-be-accessed data of the processor is a page table, and the page table is used to map a virtual address of the processor to a physical address of a memory. In S602, when receiving the request message for processing the first data, the processor queries the page table from the expansion storage apparatus to obtain a physical address of the first data, and further accesses the memory based on the physical address of the first data to read the first data.

For example, to-be-accessed data of the processor is a random entry in the network forwarding field, and the random entry may be used to indicate a correspondence between an ingress port and an egress port for data forwarding, to guide a data forwarding path. In S602, when receiving the request message for processing the first data, the processor queries the random entry from the expansion storage apparatus to obtain an egress port of the first data, and further forwards the first data through the egress port.

In the solution provided in this disclosure, the to-be-accessed data of the processor is stored in the expansion storage apparatus connected to the processor through a CXL interface, and a highest priority is configured for a request message for obtaining the to-be-accessed data stored in the expansion storage apparatus. Because of low latency performance of the CXL interface, the processor reads the to-be-accessed data from the expansion storage apparatus through the CXL interface, even in a frequent access scenario, data processing can also be implemented at low latency. In addition, the highest priority is configured for the request message for obtaining the to-be-accessed data stored in the expansion storage apparatus. In this way, it is ensured that these request messages are preferentially processed, and data processing latency is further shortened. Therefore, memory access time performance is greatly improved in the solution in this disclosure.

Further, optionally, as shown in FIG. 6, the data processing method provided in this disclosure may further include S603 before S601.

At operation S603: The expansion storage apparatus registers the expansion storage apparatus with the processor in a boot phase of a data processing device.

Boot refers to a system boot item, which is a small program that runs automatically when a computer is powered on and runs and before an operating system of the computer runs. This small program may perform operations such as creating a mapping graph of memory space and initializing a hardware device, to prepare an environment for invoking an operating system kernel finally. In this disclosure, a phase in which this small program runs is referred to as a boot phase.

It should be noted that for a specific implementation of S603, refer to a specific implementation of the foregoing property storage unit 204. Details are not described herein again.

Optionally, as shown in FIG. 6, the data processing method provided in this disclosure may further include operation S604.

At operation S604: The expansion storage apparatus configures a highest priority for a request message for accessing an entry stored in the expansion storage apparatus.

It should be noted that for a specific implementation of S604, refer to a specific implementation of the foregoing data processing device 20. Details are not described herein again.

It should be further noted that an execution sequence and an optional step may be configured for the steps included in the data processing method provided in this embodiment of this disclosure based on an actual requirement. FIG. 6 is merely a feasible example, and does not constitute a specific limitation.

In another aspect, this disclosure provides a data processing method, applied to the foregoing scenario in which the data processing device 20 performs TLB. To-be-accessed data of the processor of the data processing device 20 is a page table, the page table is used to map a virtual address of the processor to a physical address of a memory, and the page table is stored in the expansion storage apparatus in the data processing device 20. A processing procedure of the processor of the data processing device may include the following operations a to d.

Operation a: The processor receives a request message that carries the virtual address, where the request message is configured to request the processor to process first data stored in the memory indicated by the physical address corresponding to the virtual address.

Operation b: The processor queries, based on the virtual address, the page table stored in the expansion storage apparatus, and queries a mapping relationship between a virtual page table number and a physical page table number, to obtain a physical page table number corresponding to a virtual page table number.

Specifically, the processor may forward the virtual address to the expansion storage apparatus through the CXL interface, and the expansion storage apparatus feeds back, to the processor, the physical page table number corresponding to the virtual page table number in the virtual address in the page table.

Operation c: The processor calculates the physical address based on a page offset in the virtual address and the physical page table number.

Operation d: The processor accesses data of the memory based on the physical address, and reads the first data stored at a location of the physical address.

In another form of this embodiment, a computer-readable storage medium is provided. The computer-readable storage medium stores instructions. When the instructions are executed, the data processing method in the foregoing method embodiment is performed.

In another form of this embodiment, a computer program product including instructions is provided. When the computer program product runs on a computer, the computer is enabled to perform the data processing method in the foregoing method embodiment.

An embodiment of this disclosure further provides a chip system. The chip system includes a processor, configured to implement the technical method in embodiments of this disclosure. In a possible design, the chip system further includes a memory, configured to store program instructions and/or data necessary for embodiments of this disclosure. In a possible design, the chip system further includes a memory, configured to invoke, by using the processor, application code stored in the memory. The chip system may include one or more chips, or may include a chip and another discrete device. This is not specifically limited in this embodiment of this disclosure.

An embodiment of this disclosure further provides a computer-readable storage medium, including instructions, where when the instructions run on a computer, the computer is enabled to perform the data processing method.

An embodiment of this disclosure further provides a computer program product. When the computer program product runs on a computer, the computer is enabled to perform the data processing method.

According to the foregoing descriptions of the implementations, a person skilled in the art may clearly understand that, for ease and brevity of description, only division of the foregoing functional modules is used as an example for description. In actual application, the foregoing functions may be allocated to different functional modules as required, that is, an internal structure of an apparatus is divided into different functional modules, to complete all or some of the foregoing functions.

In the several embodiments provided in this disclosure, it should be understood that the disclosed apparatus and method may be implemented in another manner. For example, the foregoing apparatus embodiment is merely an example. For example, division of the modules or units is merely logical function division. In an actual implementation, there may be another division manner. For example, a plurality of units or components may be combined or integrated into another apparatus, or some features may be ignored or not performed. In addition, displayed or discussed mutual couplings or direct couplings or communication connections may be implemented through some interfaces, and indirect couplings or communication connections between apparatuses or units may be implemented in an electrical form, a mechanical form, or another form.

The units described as separate parts may or may not be physically separated, and parts displayed as units may be one or more physical units, that is, may be located in one place or may be distributed in a plurality of different places. Some or all of the units may be selected based on an actual requirement to implement the objectives of the solutions in embodiments.

In addition, functional units in embodiments of this disclosure may be integrated into one processing unit, or each unit may exist separately physically, or two or more units may be integrated into one unit. The foregoing integrated unit may be implemented in a form of hardware, or may be implemented in a form of a software functional unit.

If the integrated unit is implemented in a form of a software functional unit and sold or used as an independent product, the integrated unit may be stored in a readable storage medium. Based on such an understanding, the technical solutions of embodiments of this disclosure essentially, or the part contributing to the conventional technology, or all or some of the technical solutions may be implemented in a form of a software product. The software product is stored in a storage medium and includes several instructions for enabling a device (which may be a single-chip microcomputer, a chip, or the like) or a processor (processor) to perform all or some of the steps of the method described in embodiments of this disclosure. The foregoing storage medium includes any medium that can store program code, for example, a USB flash drive, a removable hard disk, a read-only memory (ROM), a random access memory (RAM), a magnetic disk, or an optical disc.

The foregoing descriptions are merely specific implementations of this disclosure, but are not intended to limit the protection scope of this disclosure. Any change or replacement made within the technical scope disclosed in this disclosure shall fall within the protection scope of this disclosure. Therefore, the protection scope of this disclosure shall be subject to the protection scope of the claims.

What is claimed is:

1. A data processing device, comprising:
a processor;
the processor configured to:
  obtain a virtual address of first data after receiving a request message for processing the first data;
  obtain to-be-accessed data from an expansion storage apparatus, wherein the to-be-accessed data is configured to identify a physical address corresponding to the virtual address of the first data, and
  read the first data according to the physical address; and
the expansion storage apparatus configured to connect to the processor through a compute express link (CXL) interface, the expansion storage apparatus comprising:
  a CXL chip configured to process the request message with a highest priority and an expanded storage space configured to store to-be-accessed data.

2. The data processing device according to claim 1, wherein the expanded storage space is located in the CXL chip, and the expanded storage space comprises a static random access memory (SRAM).

3. The data processing device according to claim 1, wherein the expanded storage space is located outside the CXL chip, and the expanded storage space comprises an off-chip quad data rate QDR series storage connected to the CXL chip.

4. The data processing device according to claim 1, wherein the data processing device further comprises a property storage unit; and the property storage unit is configured to store registration information, the registration information comprises one or more of the following information:
capacity, latency, or bandwidth.

5. The data processing device according to claim 4, wherein the property storage unit is configured to register the expansion storage apparatus with the processor in a boot phase of the data processing device.

6. The data processing device according to claim 4, wherein the property storage unit is deployed inside the CXL chip.

7. The data processing device according to claim 4, wherein the property storage unit is deployed in a non-volatile storage outside the CXL chip.

8. The data processing device according to claim 1, wherein the to-be-accessed data is a page table, and the page table is configured to store a mapping from a virtual address of the processor to a physical address of a memory.

9. The data processing device according to claim 1, wherein the CXL chip comprises an address decoder for addressing.

10. A data processing method, performed by a data processing device, wherein the data processing device comprises a processor and an expansion storage apparatus, the expansion storage apparatus is connected to the processor through a compute express link (CXL) interface, and the method comprises:
  receiving, by the processor, a request message for processing first data;
  obtaining, by the processor, a virtual address of the first data;
  obtaining, by the processor, to-be-accessed data from the expansion storage apparatus, wherein the to-be-accessed data is configured to identify a physical address corresponding to the virtual address of the first data; and
  reading, by the processor, the first data according to the physical address;
  wherein the expansion storage apparatus comprises a CXL chip configured to process the request message with a highest priority and an expanded storage space configured to store the to-be-accessed data.

11. The method according to claim 10, wherein the obtaining, by the processor, the to-be-accessed data from the expansion storage apparatus comprises:
  sending, by the processor, the request message to the expansion storage apparatus; and
  obtaining, by the processor, the to-be-accessed data which is sent by the expansion storage apparatus.

12. The method according to claim 11, wherein the obtaining, by the processor, the to-be-accessed data which is sent by the expanded storage space comprises:
  mapping, by the expansion storage apparatus, a physical address of the processor to a physical address of the expanded storage space after receiving the request message;
  reading, by the expansion storage apparatus, the to-be-accessed data for the physical address of the expanded storage space; and
  sending, by the expansion storage apparatus, the to-be-accessed data to the processor.

13. The method according to claim 10, wherein the expanded storage space comprises a static random access memory (SRAM) in the CXL chip.

14. The method according to claim 10, wherein the expanded storage space comprises an off-chip quad data rate (QDR) series storage connected to the CXL chip.

15. The method according to claim 10, wherein the method further comprises:

obtaining, by the processor, registration information from a property storage unit; and mapping, by the processor, the registration information to system random access memory (RAM) space in a boot phase of the data processing device.

16. The method according to claim 15, wherein the registration information comprises one or more of the following information: capacity, latency, or bandwidth.

17. The method according to claim 10, wherein the to-be-accessed data is a page table, and the page table is configured to store a mapping from a virtual address of the processor to a physical address of a memory.

18. The method according to claim 17, wherein the method further comprises:

determining, by the processor, the physical address based on a page offset in the virtual address of the first data and a physical page table number;

wherein the physical page table number corresponds to a virtual page table number in the virtual address in the page table.

19. A non-transitory computer-readable medium storing instructions that, when executed by at least one processor of a data processing device, cause a data processing device to perform operations comprising:

obtaining a virtual address of first data after receiving a request message for processing the first data;

obtaining to-be-accessed data from an expansion storage apparatus of the data processing device, wherein the to-be-accessed data is configured to identify a physical address corresponding to the virtual address of the first data, and reading the first data according to the physical address;

wherein the expansion storage apparatus is configured to connect to the at least one processor through a compute express link (CXL) interface; the expansion storage apparatus comprises a CXL chip configured to process the request message with a highest priority and an expanded storage space configured to store the to-be-accessed data.

20. The non-transitory computer-readable medium according to claim 2, wherein the operations further comprise:

obtaining registration information from a property storage unit; and mapping the registration information to system random access memory (RAM) space in a boot phase of the data processing device.

\*    \*    \*    \*    \*